US007878261B2

(12) United States Patent
Masumoto

(10) Patent No.: US 7,878,261 B2

(45) Date of Patent: Feb. 1, 2011

(54) OPERATING APPARATUS FOR WORK VEHICLE

(75) Inventor: Koji Masumoto, Sakai (JP)

(73) Assignee: Kubota Corporation, Osaka (JP)

( * ) Notice: Subject to any disclaimer, the term of this patent is extended or adjusted under 35 U.S.C. 154(b) by 128 days.

(21) Appl. No.: 12/051,810

(22) Filed: Mar. 19, 2008

(65) Prior Publication Data

US 2008/0296032 A1 Dec. 4, 2008

(30) Foreign Application Priority Data

May 30, 2007 (JP) ............................ 2007-143681

(51) Int. Cl.
*A01B 63/02* (2006.01)

(52) U.S. Cl. ........................ 172/321; 172/439; 172/776

(58) Field of Classification Search ................ 172/321, 172/439

See application file for complete search history.

(56) References Cited

U.S. PATENT DOCUMENTS

| | | | | | |
|---|---|---|---|---|---|
| 2,297,992 | A | * | 10/1942 | Swim | 280/414.5 |
| 2,330,283 | A | * | 9/1943 | Hipple | 172/166 |
| 2,638,045 | A | * | 5/1953 | Heitshu | 172/316 |
| 2,705,444 | A | * | 4/1955 | McCormick | 254/113 |
| 4,183,287 | A | * | 1/1980 | Hamada et al. | 91/384 |
| 4,216,680 | A | * | 8/1980 | Hayashi et al. | 74/473.33 |
| 4,279,324 | A | * | 7/1981 | Yotsumoto et al. | 180/336 |
| 4,643,442 | A | * | 2/1987 | Ohashi et al. | 280/461.1 |
| 4,733,745 | A | * | 3/1988 | Lumpkins | 180/315 |
| 5,720,214 | A | * | 2/1998 | Kawamura et al. | 91/522 |
| 2008/0016976 | A1 | * | 1/2008 | Fukudome et al. | 74/471 XY |

FOREIGN PATENT DOCUMENTS

| | | |
|---|---|---|
| JP | 4110406 U | 9/1992 |
| JP | 7-117586 | 5/1995 |
| JP | 2005-054510 | 3/2005 |

OTHER PUBLICATIONS

Two John Deere Tractor 2320 photos.

* cited by examiner

*Primary Examiner*—Thomas B Will
*Assistant Examiner*—Joel F Mitchell
(74) *Attorney, Agent, or Firm*—The Webb Law Firm

(57) ABSTRACT

An operating apparatus for a work vehicle with a detachable implement provided with a hydraulic actuator, comprising:

a control valve and a link mechanism for operatively connecting the control valve to an operating lever, both the control valve and link mechanism being disposed beneath a driver seat of the work vehicle; and a locking lever configured to be switched between a locked position for holding the operating lever in a neutral position, and a lock-releasing position for releasing the hold on the operating lever, wherein the locking lever is disposed between the driver seat and a rear fender positioned laterally of the driver seat.

5 Claims, 13 Drawing Sheets

OPERATING APPARATUS FOR WORK VEHICLE

BACKGROUND OF THE INVENTION

1. Field of the Invention

The present invention relates to an operating apparatus for a work vehicle to which an implement provided with hydraulic actuators can be attached.

2. Description of the Related Art

Among implements that can be attached to work vehicles, one example of an implement provided with hydraulic actuators is a front loader provided with, i.e., hydraulic cylinders for driving a boom, hydraulic cylinders for driving a bucket, and the like. In some cases in which a front loader is installed on a work vehicle, the work vehicle is also provided with a support frame for supporting the front loader; left and right braces of the front loader are detachably connected to the support frame; and the support frame is also equipped with a boom control valve for controlling the flow of hydraulic fluid to the hydraulic cylinders for driving the boom, a bucket control valve for controlling the flow of hydraulic fluid to the hydraulic cylinders for driving the bucket, an operating lever operatively connected with these control valves via a link mechanism, and other components (for example, see Japanese Unexamined Utility Model Application No. 4-110406).

The configuration described above has an external structure in which the entire operating system for the front loader is placed on the exterior of the vehicle. Therefore, a decorative structure is needed to cover up the boom control valve, the bucket control valve, the link mechanism, and other components so that they are not exposed. The number of components increases proportionately, which leads to increases in cost, weight, and the like.

In a work vehicle equipped with a cabin, there is also a need to configure the cabin so that it can correspond to the operating system of the external structure. Therefore, the cabin structure becomes complicated, which leads to further increases in cost, weight, and the like.

SUMMARY OF THE INVENTION

An object of the present invention is to improve the operating apparatus according to the conventional art described above.

An operating apparatus for a work vehicle with a detachable implement provided with hydraulic actuators according to the present invention comprises:

a control valve that is disposed beneath a driver seat of the work vehicle and that controls flow of hydraulic fluid to the hydraulic actuator;

a link mechanism that is disposed beneath the driver seat of the work vehicle and that operatively connects the control valve to an operating lever; and a locking lever configured to be switched between a locked position for holding the operating lever in a neutral position, and a lock-releasing position for releasing the hold on the operating lever, wherein the locking lever is disposed between the driver seat and a rear fender positioned laterally of the driver seat.

According to this configuration, the control valve and the link mechanism are positioned beneath the driver seat, thereby eliminating the need for a decorative structure for covering up the control valve and the link mechanism, and the control valve and link mechanism can be prevented from hindering occupants from boarding or driving the work vehicle. Since the operating lever is positioned in proximity to the driver seat along with the control valve and link mechanism, the operating lever can be easily operated from a seated position.

While the vehicle is not being operated, the operating lever is held in the neutral position by the locking lever, whereby the implement can be prevented from operating due to unexpected contact with the operating lever positioned in proximity to the driver seat. Placing the locking lever between the driver seat and the rear fender eliminates the need for a decorative structure for covering up the locking lever, makes it easy to operate the locking lever from a seated position, and also makes it possible to prevent the locking lever from hindering occupants from boarding or driving the work vehicle.

In the embodiment of the present invention, the link mechanism preferably has a first pivot member that rotates around a first axis extending left and right, and a second pivot member that rotates around a second axis extending front to back.

In the embodiment of the present invention, it is preferable that an engaged member be fixed to either one of the first pivot member and the second pivot member; that a locking pin be interlocked and connected to the locking lever; and that moving the locking lever to the left or right causes the locking pin to engage with the engaged member, thereby holding the operating lever in the neutral position.

In the embodiment of the present invention, the operating lever preferably has, in a region in proximity to the link mechanism, a first portion extending generally in the front-to-back direction; a second portion extending generally in the left-to-right direction from the front end of the first portion; and a third portion extending generally upward from the distal end of the second portion.

DESCRIPTION OF THE PREFERRED EMBODIMENTS

Figure 1:
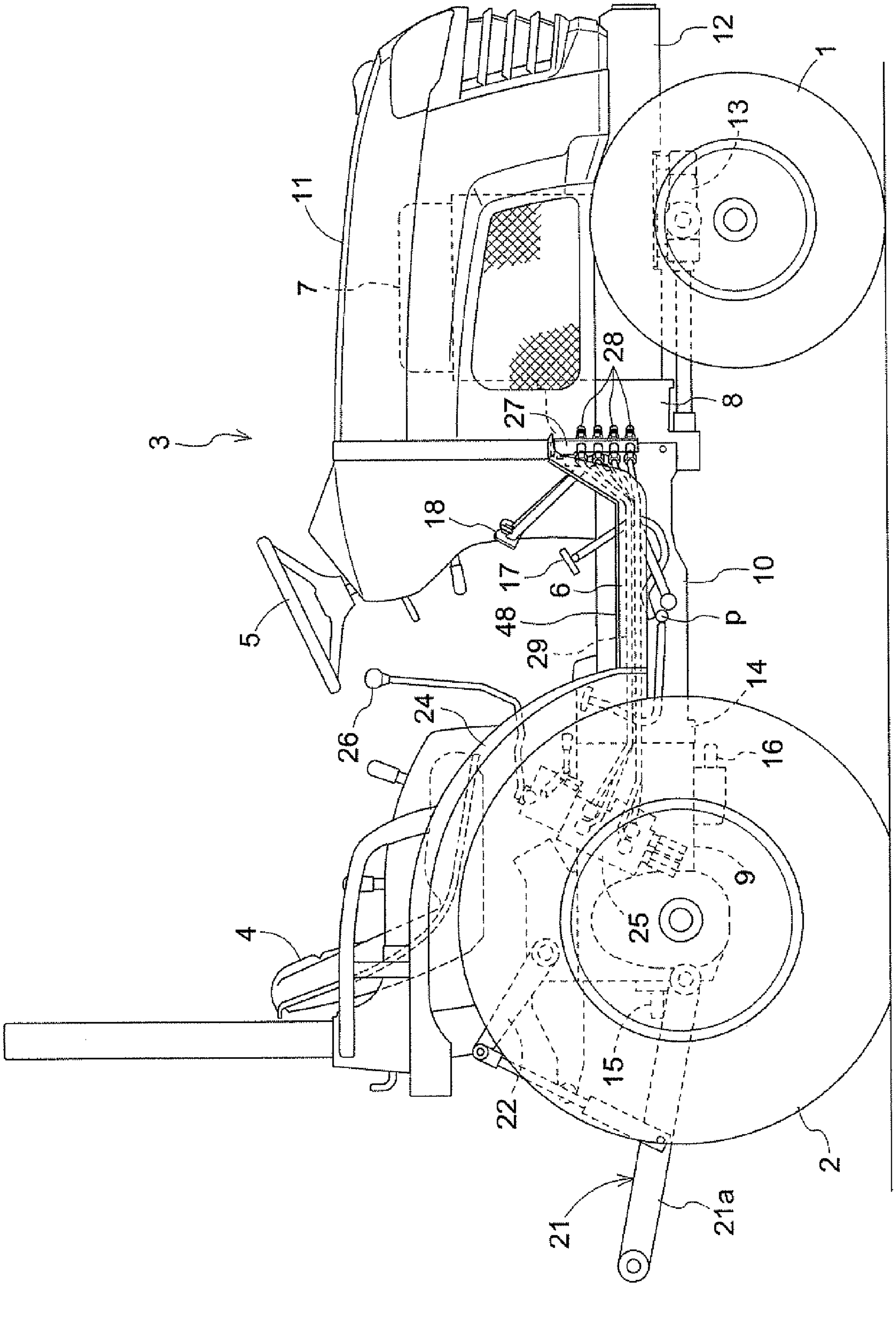
FIG. 1 is an overall side view of a tractor.
Figure 2:
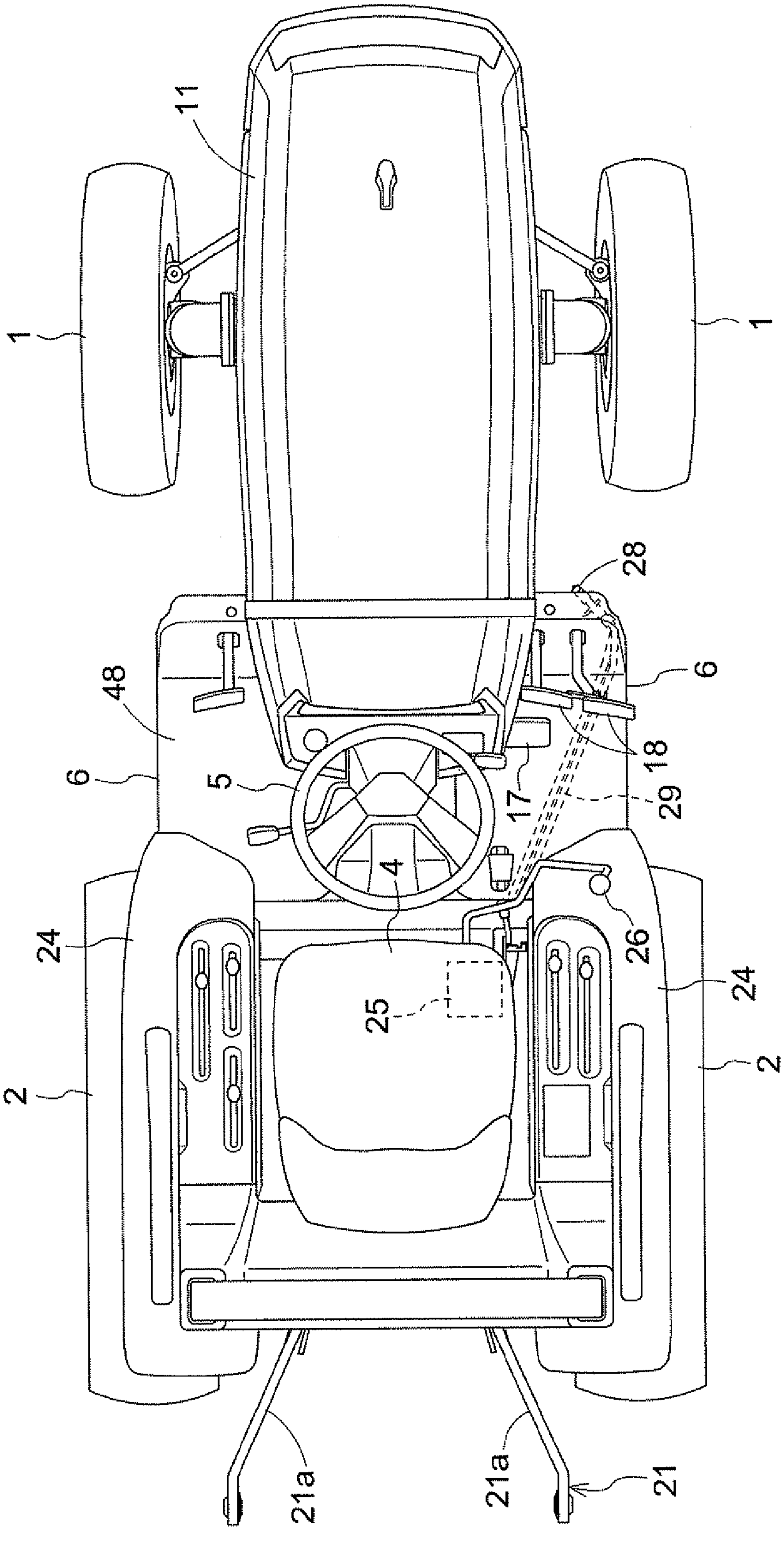
FIG. 2 is an overall plan view of the tractor.

FIG. 1 is an overall side view of a tractor according to the present invention, and FIG. 2 is an overall plan view of the same. In this tractor, a driver seat 4, a steering wheel 5 for turning the front wheels, a boarding step 6 made of sheet metal, and other components are provided to a four-wheel drive moving vehicle 3 that includes pairs of left and right front wheels 1 and rear wheels 2 capable of transmission, as shown in these drawings.

In this moving vehicle 3, an engine 7 is installed in the front part. A clutch housing 8 that has a main clutch (not shown) in the interior is connected to the rear end of the engine 7. A transmission case 9 that has a gear transmission device or the like in the interior is connected to the clutch housing 8 via an intermediate frame 10 that has a hollow structure made of sheet metal. The top side of the engine 7 is covered by a hood 11, and a front frame 12 is connected to the bottom part of the engine. A front axle case 13 that has a differential device (not shown) or the like for the front wheels in the interior is rollably supported in the front frame 12. The front wheels 1 are turnably installed in the left and right sides of the front axle case 13, and the rear wheels 2 are installed at the left and right sides in the rear part of the transmission case 9.

The power from the engine 7 is transferred via the main clutch or another component to a hydrostatic continuously variable transmission (hereinafter abbreviated as HST) 14 connected to the front end of the transmission case 9. The gear-reduced power derived from the output shaft (not shown) of the HST 14 undergoes multiple stages of gear reduction via a gear transmission device or the like, and is then distributed between front wheel drive and rear wheel drive within the transmission case 9. Power for front wheel drive is transmitted to the left and right front wheels 1 via a front wheel transmission device (not shown) provided within the transmission case 9, a front wheel intermediate transmission axle (not shown) that passes through the intermediate frame 10, a front wheel differential device, and other components. Power for rear wheel drive is transmitted to the left and right rear wheels 2 via a rear wheel differential device or the like provided within the transmission case 9. Power that has not undergone gear reduction and that is derived from the input shaft (not shown) of the HST 14 is transmitted via an operational clutch (not shown) or the like provided within the transmission case 9. This power is transmitted to a rear-PTO shaft 15 that derives operational power and that protrudes backward from the rear of the transmission case 9, and a mid-PTO shaft 16 that derives operational power and that faces forward from the lower front of the transmission case 9.

A gear change pedal 17 that is urged back to a neutral position is placed on the right side of the boarding step 6 and is allowed to swing around a fulcrum p, as shown in FIGS. 1 through 5. The gear change pedal 17 is configured with a front pedal 17*f* for forward gearshifting and a rear pedal 17*b* for reverse gearshifting connected via front and rear arms 17*a* or the like, and the gear change pedal 17 is operatively connected with the transmission operation shaft (not shown) of the HST 14 via a link mechanism (not shown) for operative connections. Thereby, when the front pedal 17*f* is depressed, the speed of forward movement changes according to the amount by which the front pedal 17*f* is depressed. When the rear pedal 17*b* is depressed, the speed of backward movement changes according to the amount by which the rear pedal 17*b* is depressed. When the pedals are released, the gear change pedal 17 swings back to the neutral position, the movement speed decreases according to the distance by which the pedal swings back, and the movement speed reaches zero as the gear change pedal 17 returns to the neutral position.

A pair of left and right side brake pedals 18 is placed on the right front side part of the boarding step 6. A pair of left and right side brakes 19 for braking the corresponding rear wheels 2 is mounted within the transmission case 9. The side brake pedals 18 are operatively connected with the corresponding side brakes 19 via a link mechanism (not shown) for operative connections. It is thereby possible to make narrow turns while braking the rear wheel 2 on the inside of the turn. This can be achieved by turning the left and right front wheels 1 to either the left or right while depressing the side brake pedal 18 on the inside of the turn. It is also possible to reduce the travelling speed by simultaneously depressing both the left and right side brake pedals 18.

Figure 4:
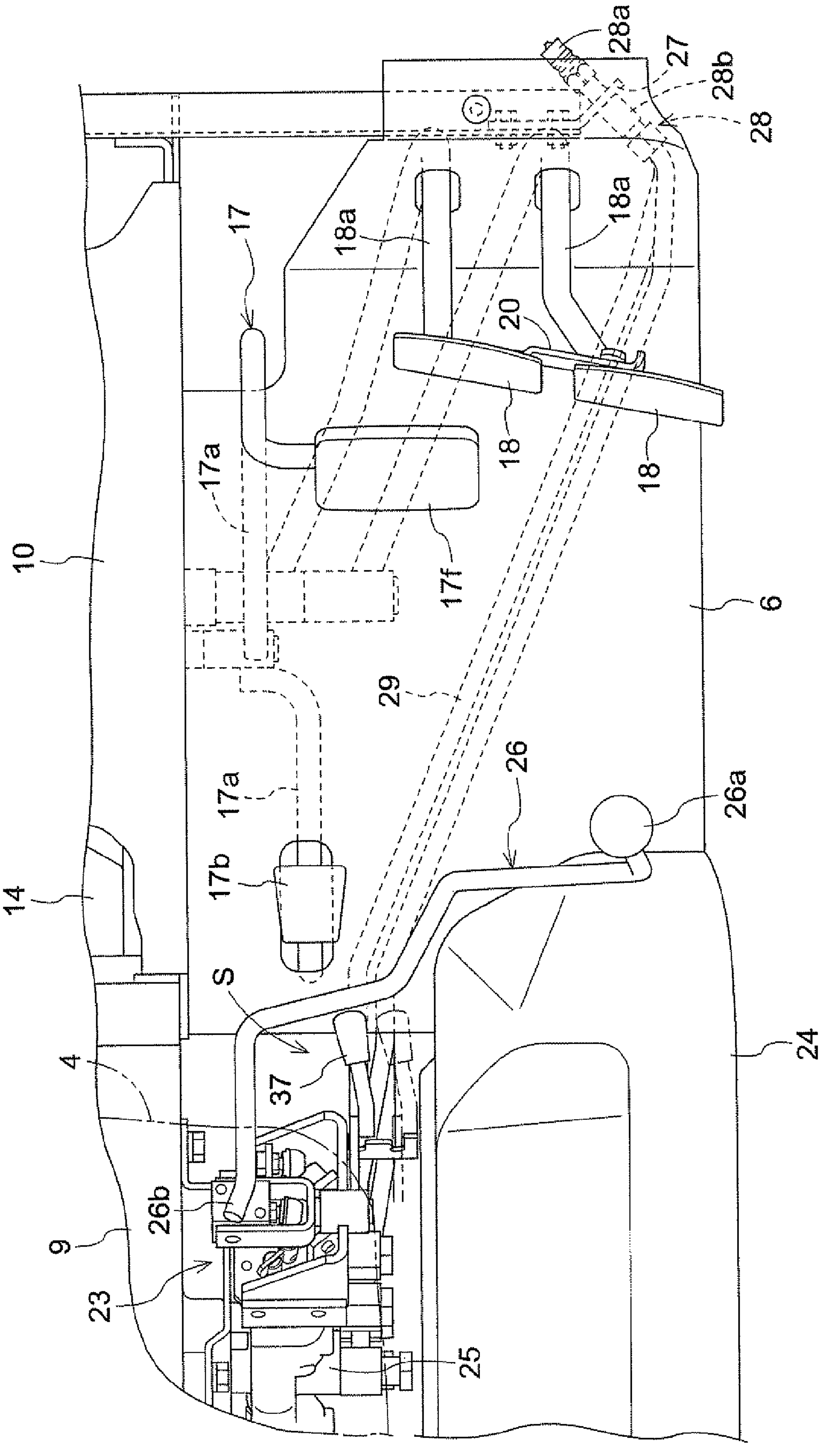
FIG. 4 is a fragmentary plan view showing the arrangement of the operating system in the implement.
Figure 5:
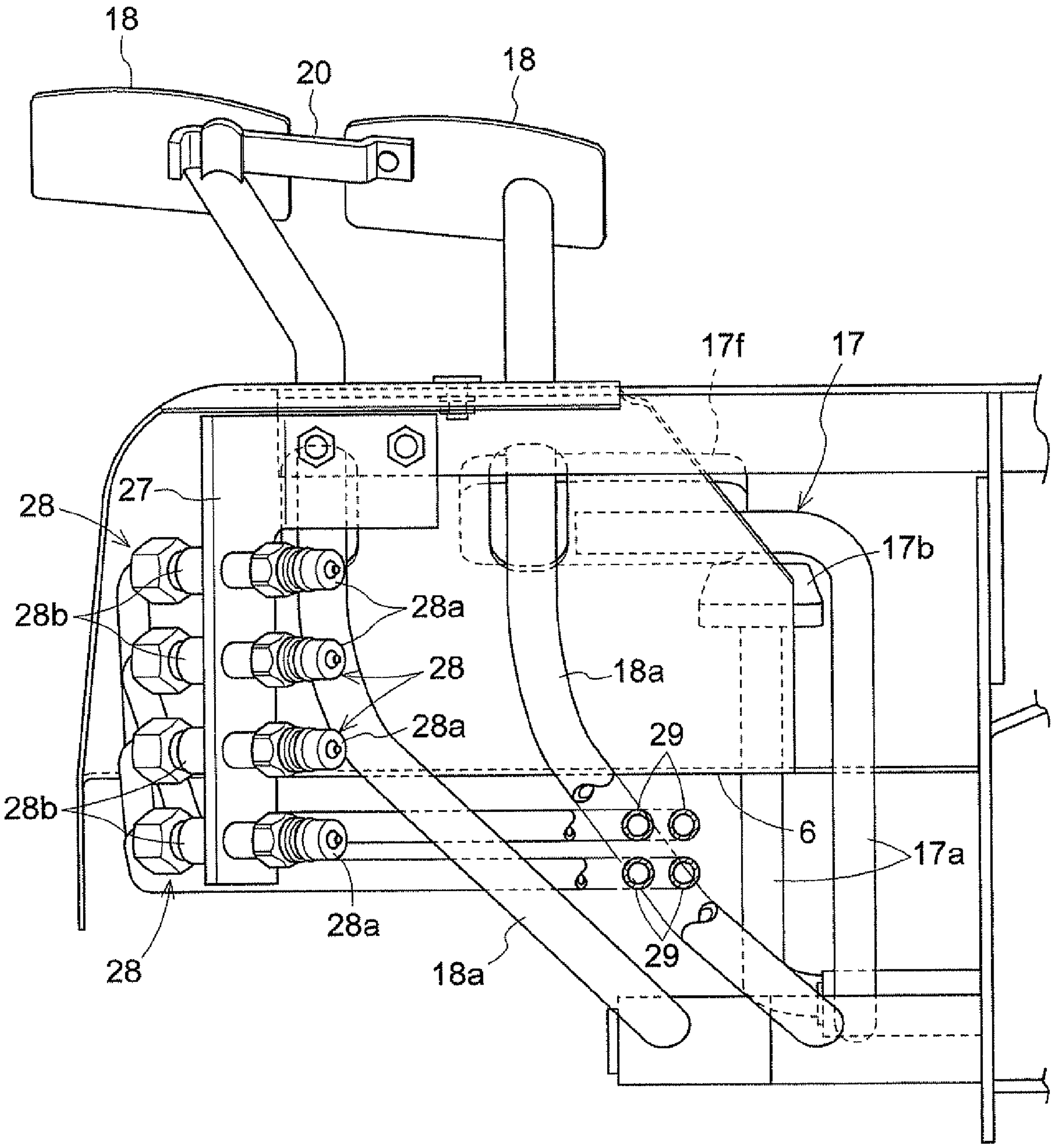
FIG. 5 is a fragmentary front view showing the hydraulic pipes in the implement.

The left and right side brake pedals 18 are configured so that they can be connected by a connecting fixture 20, as shown in FIGS. 4 and 5. Connecting the left and right side brake pedals 18 by means of the connecting fixture 20 makes it possible to evenly and simultaneously brake the left and right side brakes 19 when the vehicle is moving, such as travelling over a road. An engaging fixture (not shown) placed in proximity to the side brake pedals 18 in the boarding step 6 is used to engage and hold the left and right side brake pedals 18 linked by the connecting fixture 20 at the braking position, whereby the left and right side brakes 19 can be made to function as a parking brake.

A link mechanism 21 that enables a rotary tilling apparatus or another such rear-connecting implement (not shown) to be attached to the moving vehicle 3 is placed at the rear part of the transmission case 9, as shown in FIGS. 1 and 2. The link mechanism 21 has a pair of left and right bottom links 21*a* that are operatively connected with a pair of left and right lift arms 22, which are mounted at the upper rear of the transmission case 9 and are capable of swinging up and down. The lift arms 22 swing up and down due to the operation of hydraulic lift cylinders (not show) provided within the transmission case 9.

In other words, by being connected to the link mechanism 21, a rear-connecting implement can be raised and lowered by the operation of the hydraulic cylinders. An input shaft provided to the rear-connecting implement is connected to the rear-PTO shaft 15, and operational power derived from the rear-PTO shaft 15 is transmitted to the rear-connecting implement, whereby the rear-connecting implement can be driven.

Though not shown in the drawings, a mid-mount mower or another such middle-connecting implement mounted in the longitudinal middle can additionally be provided to the moving vehicle 3 between the left and right front wheels 1 and the left and right rear wheels 2. In cases in which a middle-connecting implement is also mounted, an input shaft provided to the middle-connecting implement is connected to the mid-PTO shaft 16, and the operational power derived from the mid-PTO shaft 16 is transmitted to the middle-connecting implement, whereby the middle-connecting implement can be driven.

A control valve 25, which is used for both the hydraulic source and the hydraulic cylinders that raise and lower the lift arms, is connected to the right side of the transmission case 9 so as to be positioned directly below the right front part of the driver seat 4, as shown in FIGS. 1 through 6. The control valve 25 is configured with a first spool 25*a* and a second spool 25*b* that switch between three positions and return to neutral. These spools are capable of sliding up and down and are mounted to a valve body 25*c* provided with a plurality of oil ducts (not shown) or the like. A link mechanism 23 that is used for operative connections and that operatively connects the top ends of the spools 25*a*, 25*b* with an operating lever 26 is mounted at the top end of the control valve 25. The operating lever 26 swings in a cross pattern; i.e., the operating lever 26 is capable of operating in one direction and swinging in another direction perpendicular to the first direction. A handle 26*a* of the operating lever 26 extends from the link mechanism 23 in a curved formation so as to be positioned above the front of a right-side rear fender 24, and so that a space S is formed between the proximal end of the handle 26*a*, the driver seat 4, and the right-side rear fender 24, as seen in a plan view. This space S is formed to be comparatively large so that one can fit their hand inside. The operating lever 26 has, in proximity to the link mechanism 23, a first portion extending generally in the front-back direction, a second portion extending generally in the left-right direction from the first portion, and a third portion extending generally upward from the distal end of the second portion.

A supporting plate 27 for supporting hydraulic pipe fittings is placed to the right and in front of the boarding step 6. The supporting plate 27 is supported on the moving vehicle 3. Four hydraulic pipe fittings 28 provided with automatically closed connecting ports 28*a* on one side are arrayed in a vertical row along the supporting plate 27. In each hydraulic pipe fitting 28, a connecting port 28*b* on the other side is connected via one of four metal hydraulic pipes 29 to a corresponding port of four connecting ports (not shown) provided to the right side surface of the control valve 25.

The four hydraulic pipes 29 are aligned in two vertical rows and two horizontal rows on the reverse side of the boarding step 6. The pipes are laid so as to pass by the horizontally outward sides of an arm part 17*a* of the gear change pedal 17 and arm parts 18*a* of the side brake pedals 18, and the pipes are then switched to single vertical row alignment on the front side of the boarding step 6, where they are connected to corresponding hydraulic pipe fittings 28.

In other words, this tractor is equipped with an auxiliary hydraulic apparatus 30 comprising dual hydraulic circuitry, configured so that the excess space on the right side of the tractor is effectively utilized, and the flow of hydraulic fluid can be controlled by the cross-pattern swinging of the operating lever 26 on the right side of the moving vehicle 3. The tractor can thereby be additionally equipped with a front loader R or another such hydraulic implement that requires dual hydraulic circuitry.

Figure 6:
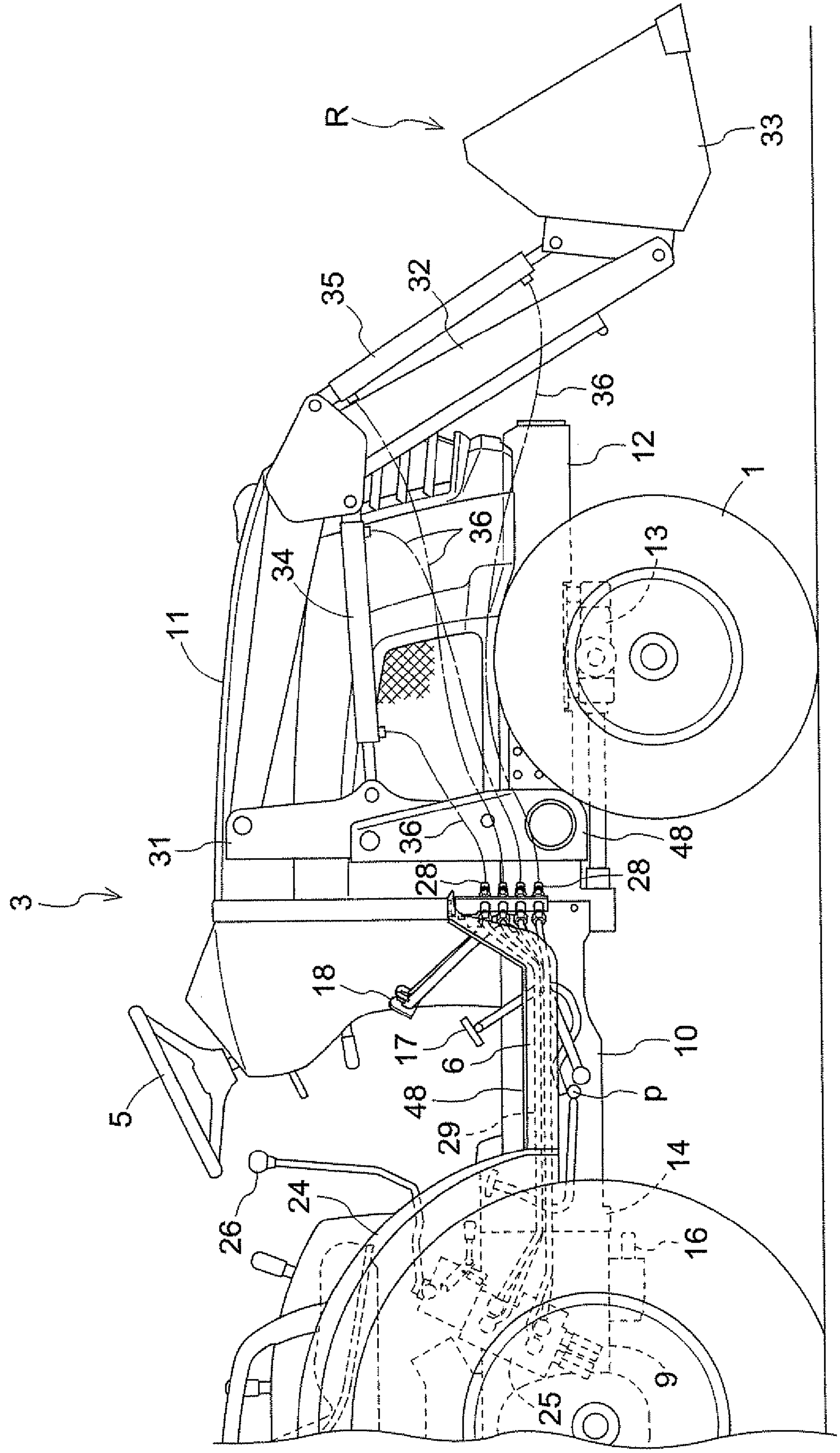
FIG. 6 is a side view of the tractor showing the state in which the front loader is mounted.
Figure 7:
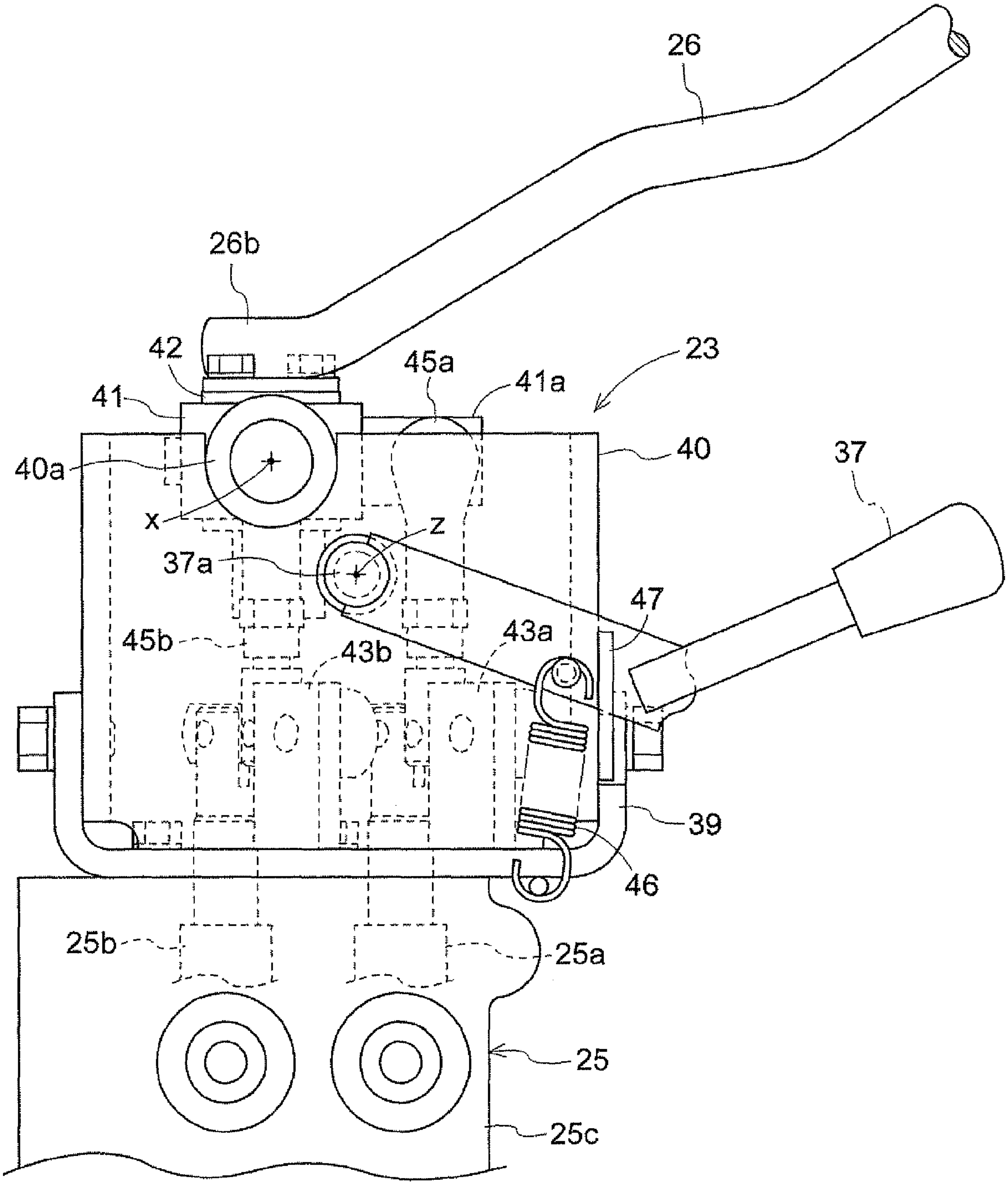
FIG. 7 is a fragmentary side view showing the operating apparatus in the implement.
Figure 8:
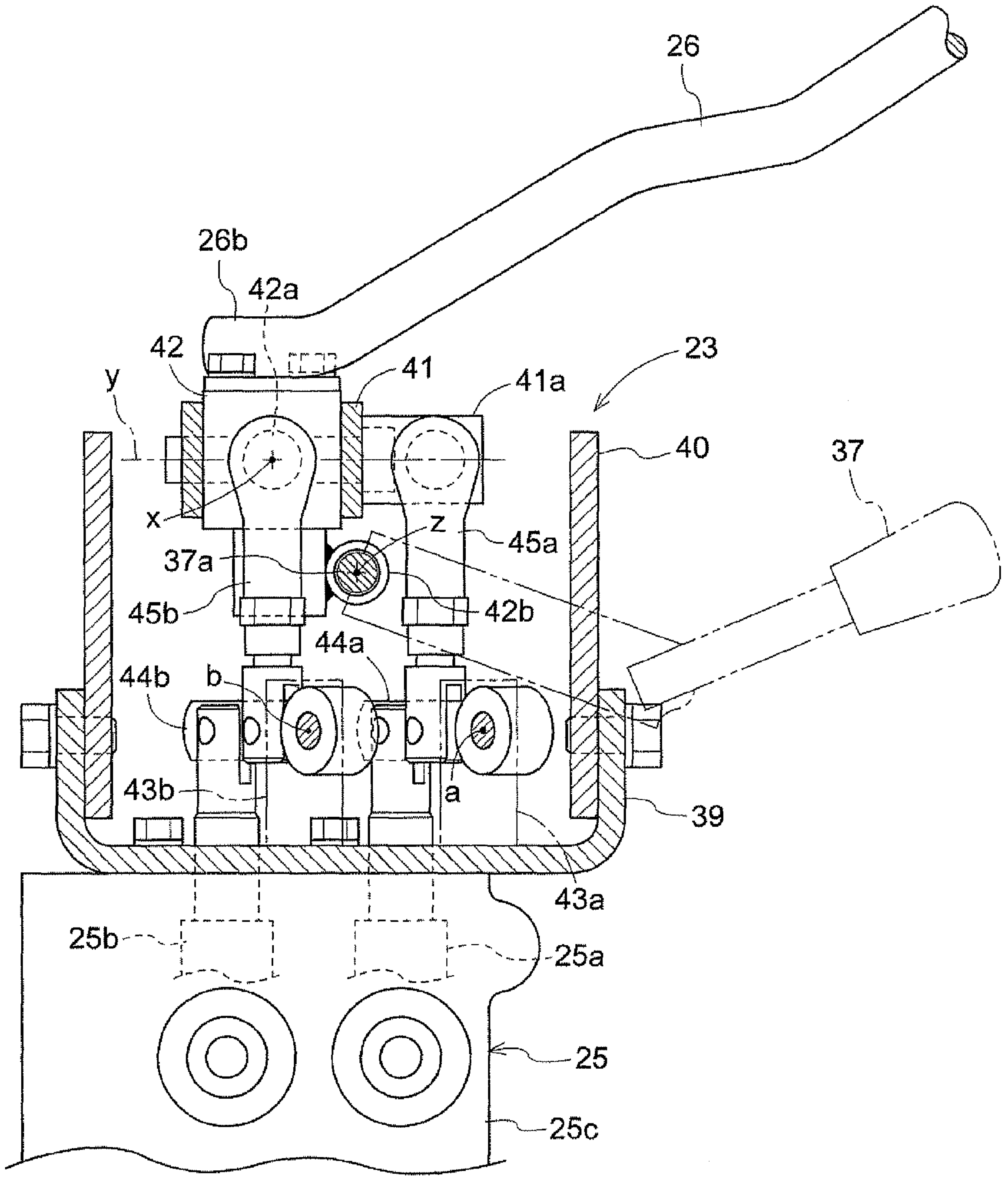
FIG. 8 is a fragmentary longitudinal cross-sectional side view showing the operating apparatus in the implement.

The front loader R is provided with a pair of left and right braces 31 that are detachably connected to the moving vehicle 3, as shown in FIG. 6. Booms 32 are connected to the top ends of the braces 31 and are capable of swinging up and down. A bucket 33 is connected to the distal ends of the booms 32 and is capable of dump-swinging. A pair of left and right first hydraulic cylinders (an example of hydraulic actuators) 34 that move back and forth to drive the booms is installed extending between the left and right corresponding braces 31 and the left and right booms 32. A pair of left and right second hydraulic cylinders (an example of hydraulic actuators) 35 that move back and forth to drive the bucket is installed extending between the left and right corresponding booms 32 and the bucket 33.

After the front loader R is mounted to the front of the tractors the left and right first hydraulic cylinders 34 and second hydraulic cylinders 35 are connected to the corresponding hydraulic pipe fittings 28 via hydraulic hoses 36.

In cases in which a front loader R is mounted on the tractor, a supporting frame 38 for supporting the front loader is additionally mounted on the front frame 12, and the left and right braces 31 of the front loader R are detachably connected to the supporting frame 38.

A first bracket 39 shaped as a U as seen from the side is connected by bolts to the top end of the control valve 25, as shown in FIGS. 7 through 11. A second bracket 40 in the shape of a U in plan view is connected by bolts to the first bracket 39 so as to be in contact with the insides of the first bracket 39. In the concave space within the second bracket 40, a boss 40*a* is mounted for rotatably supporting a first pivot member 41 shaped as a U in plan view, wherein the first pivot member 41 rotates around an axis x oriented to the left and right. A second pivot member 42 placed within the concave space in the first pivot member 41 is supported to be capable of rotating around an axis y oriented front to back. A proximal end 26*b* of the operating lever 26 is connected by bolts to the top surface of the second pivot member 42.

A first supporting piece 43*a* and a second supporting piece 43*b* are erected within the concave space in the first bracket 39. A first operative connecting link 44*a* is supported by the first supporting piece 43*a* and is capable of swinging up and down about a first fulcrum a. A second operative connecting link 44*b* is supported by the second supporting piece 43*b* and is capable of swinging up and down about a second fulcrum b. The free end of the first operative connecting link 44*a* is connected by a pin to the top end of the first spool 25*a*. The free end of the second operative connecting link 44*b* is connected by a pin to the top end of the second spool 25*b*.

A operative connecting arm 41*a* that extends forward is provided to the first pivot member 41. An operative connecting pin 42*a* that extends horizontally outward is provided to the second pivot member 42. The operative connecting arm 41*a* is operatively connected with the middle of the first operative connecting link 44*a* via a first operative connecting member 45*a* that has a ball joint. The operative connecting pin 42*a* is operatively connected with the middle of the second operative connecting link 44*b* via a second operative connecting member 45*b* that has a ball joint.

As a result of the configuration described above, the spools 25*a*, 25*b* automatically return to their neutral positions when the operating lever 26 is not being operated, whereby the handle 26*a* of the operating lever 26 is positioned in the neutral position. When the handle 26*a* of the operating lever 26 is operated forwards or backwards, the first pivot member 41 rotates around the axis x oriented to the left and right in accordance with this operation, the first operative connecting member 45*a* is displaced vertically, and the first operative connecting link 44*a* swings vertically about the first fulcrum a, whereby the first spool 25*a* slides vertically in relation to the valve body 25*c*. When the handle 26*a* of the operating lever 26 is operated to the left or right, the second pivot member 42 rotates around the axis y oriented front to back in accordance with this operation, the second operative connecting member 45*b* is displaced vertically, and the second operative connecting link 44*b* swings vertically about the second fulcrum b, whereby the second spool 25*b* slides vertically in relation to the valve body 25*c*.

In other words, the link mechanism 23 used for operative connections to operatively connect the spools 25*a*, 25*b* of the control valve 25 with the operating lever 26 is substantially accommodated within the concave space of the first bracket 39 and the concave space of the second bracket 40 above the control valve 25 by the use of the first pivot member 41, the second pivot member 42, the first operative connecting link 44*a*, the second operative connecting link 44*b*, the first operative connecting member 45*a*, the second operative connecting member 45*b*, and other components.

In this tractor, the link mechanism 23 is thereby placed together with the control valve 25 within the excess space between the right-side rear fender 24 and the transmission case 9 formed directly below the right front part of the driver seat 4. The control valve 25 and link mechanism 23 are arranged so as not to protrude past the driver seat 4 in a plan view.

The first bracket 39 shaped as a U as viewed from the side and the second bracket 40, which is shaped as a U in a plan view and is used to support the operating lever 26 and the link mechanism 23, are connected in the shape of a very strong box having excellent shape retention, whereby the operating lever 26 and the link mechanism 23 can be supported in a very strong and stable manner.

Moreover, the first bracket 39 and the second bracket 40 are separably connected by bolts whereby, for example, the first bracket 39 that attaches the first operative connecting link 44*a* and the second operative connecting link 44*b* is connected by bolts to the top end of the control valve 25, the first operative connecting link 44*a* is connected to the first spool 25*a*, and the second operative connecting link 44*b* is connected to the second spool 25*b* when the link mechanism 23 is attached to the top end of the control valve 25. The second bracket 40 that attaches the first pivot member 41, the second pivot member 42, the first operative connecting member 45*a*, and the second operative connecting member 45*b* is then connected by bolts to the first bracket 39; the first operative connecting member 45*a* is connected to the first operative connecting link 44*a*; and the second operative connecting member 45*b* is connected to the second operative connecting link 44*b*, whereby the link mechanism 23 can be simply attached to the top end of the control valve 25.

In cases in which a front loader R is mounted, the first hydraulic circuitry, whose flow of hydraulic fluid is controlled by the first spool 25*a*, is designed with the hydraulic pipe fittings 28 of the first hydraulic circuitry connected via the hydraulic hoses 36 to the first hydraulic cylinders 34 for driving the booms. In this design, the hydraulic pipe fittings 28 of the first hydraulic circuitry are connected so that operating the handle 26*a* of the operating lever 26 forward from the neutral position causes the first hydraulic cylinders 34 for driving the booms to retract and lower the left and right booms 32. Conversely, operating the handle 26*a* of the operating lever 26 backward from the neutral position causes the first hydraulic cylinders 34 for driving the booms to extend and raise the left and right booms 32.

The second hydraulic circuitry, whose flow of hydraulic fluid is controlled by the second spool 25*b*, is designed with the hydraulic pipe fittings 28 of the second hydraulic circuitry connected via the hydraulic hoses 36 to the second hydraulic cylinders 35 for driving the bucket. In this design, the hydraulic pipe fittings 28 of the second hydraulic circuitry are connected so that operating the handle 26*a* of the operating lever 26 to the left from the neutral position causes the second hydraulic cylinders 35 for driving the bucket to retract and swing the bucket 33 upward in a scooping motion. Conversely, operating the handle 26*a* of the operating lever 26 to the right from the neutral position causes the second hydraulic cylinders 35 for driving the bucket to extend and swing the bucket in a dumping motion.

The operating lever 26 is configured so as to be able to be engaged and held at the neutral position by a locking lever 37, as shown in FIGS. 1 through 11. The locking lever 37 is placed between the driver seat 4 and the right-side rear fender 24 so as not to protrude past the outer edge of the rear fender 24, and also so as to extend out from the space S formed between the driver seat 4, the right-side rear fender 24, and the operating lever 26 in a plan view. The proximal end of the locking lever 37 is provided with a locking pin 37*a* that extends towards the interior of the vehicle body and is oriented left and right. The locking pin 37*a* is supported in the boss 40*a* of the second bracket 40 so as to be capable of sliding along the axis z oriented left to right, and also to be capable of rotating around the axis z.

An extension spring 46 that swingably urges the locking lever 37 downward is provided extending between the locking lever 37 and the first bracket 39. A holding clasp 47 is mounted on the second bracket 40, and this holding clasp is formed from a first concavity 47*a* for engaging and holding the locking lever 37 urged slidably downward in a locked position r, and a second concavity 47*b* for engaging and holding the locking lever 37 in a lock-releasing position ur. The second pivot member 42 is provided with a boss 42*b* (engaged member) through which the locking pin 37*a* can be inserted when the handle 26*a* of the operating lever 26 is in the neutral position.

Figure 9:
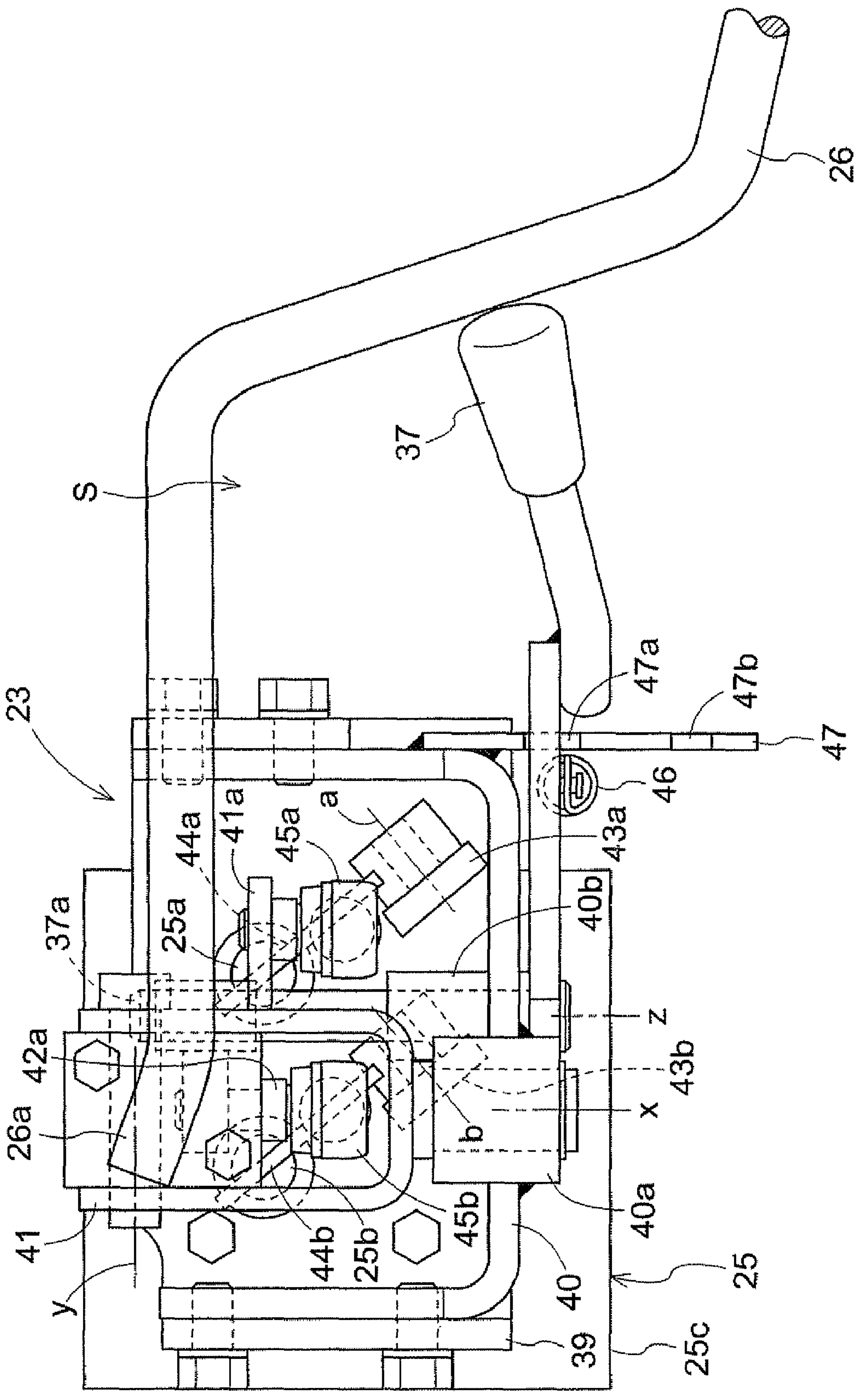
FIG. 9 is a fragmentary plan view showing the operating apparatus in the implement.
Figure 10:
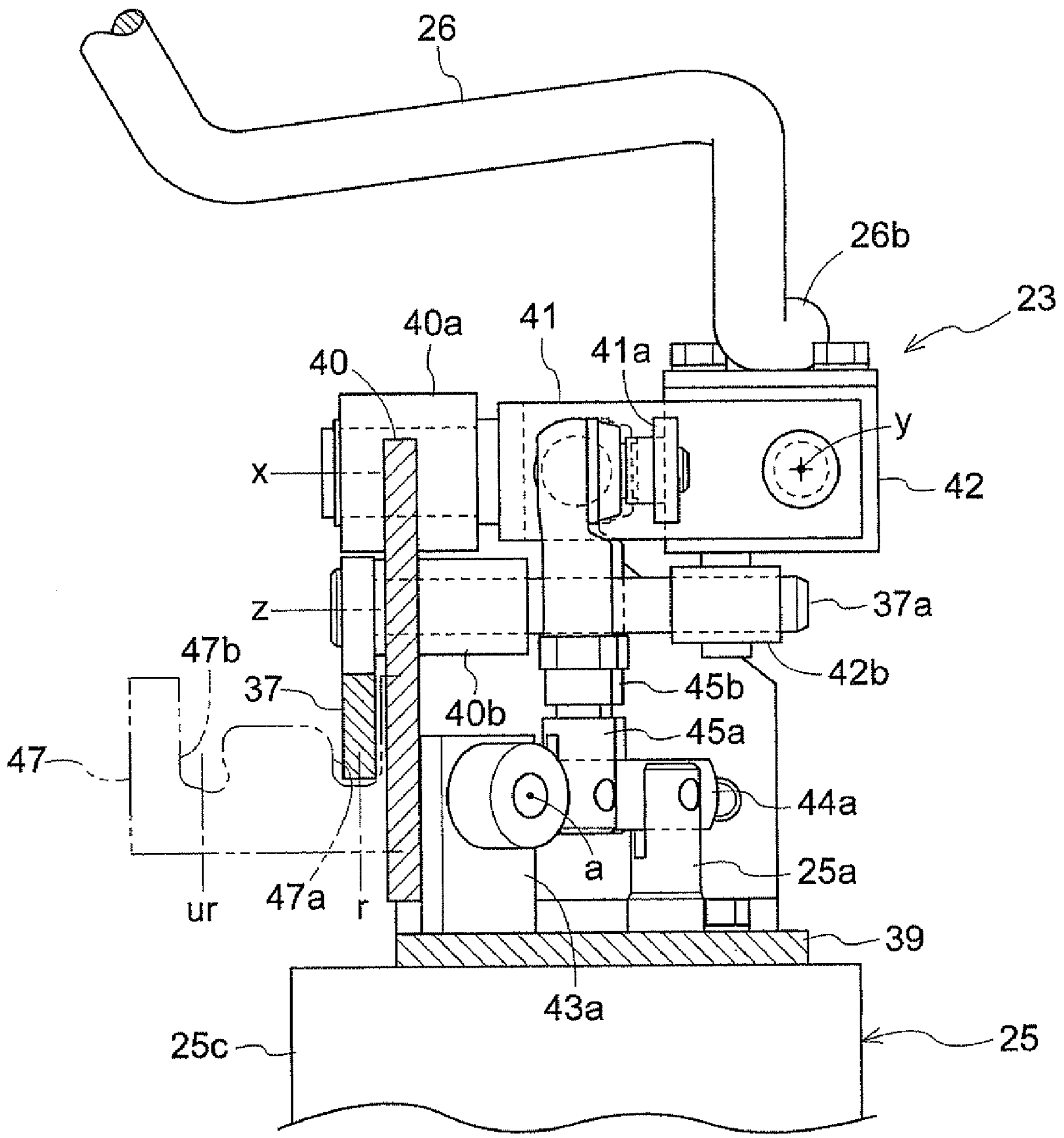
FIG. 10 is a fragmentary longitudinal cross-sectional front view showing the state in which a locking lever is operated to the locked position.
Figure 11:
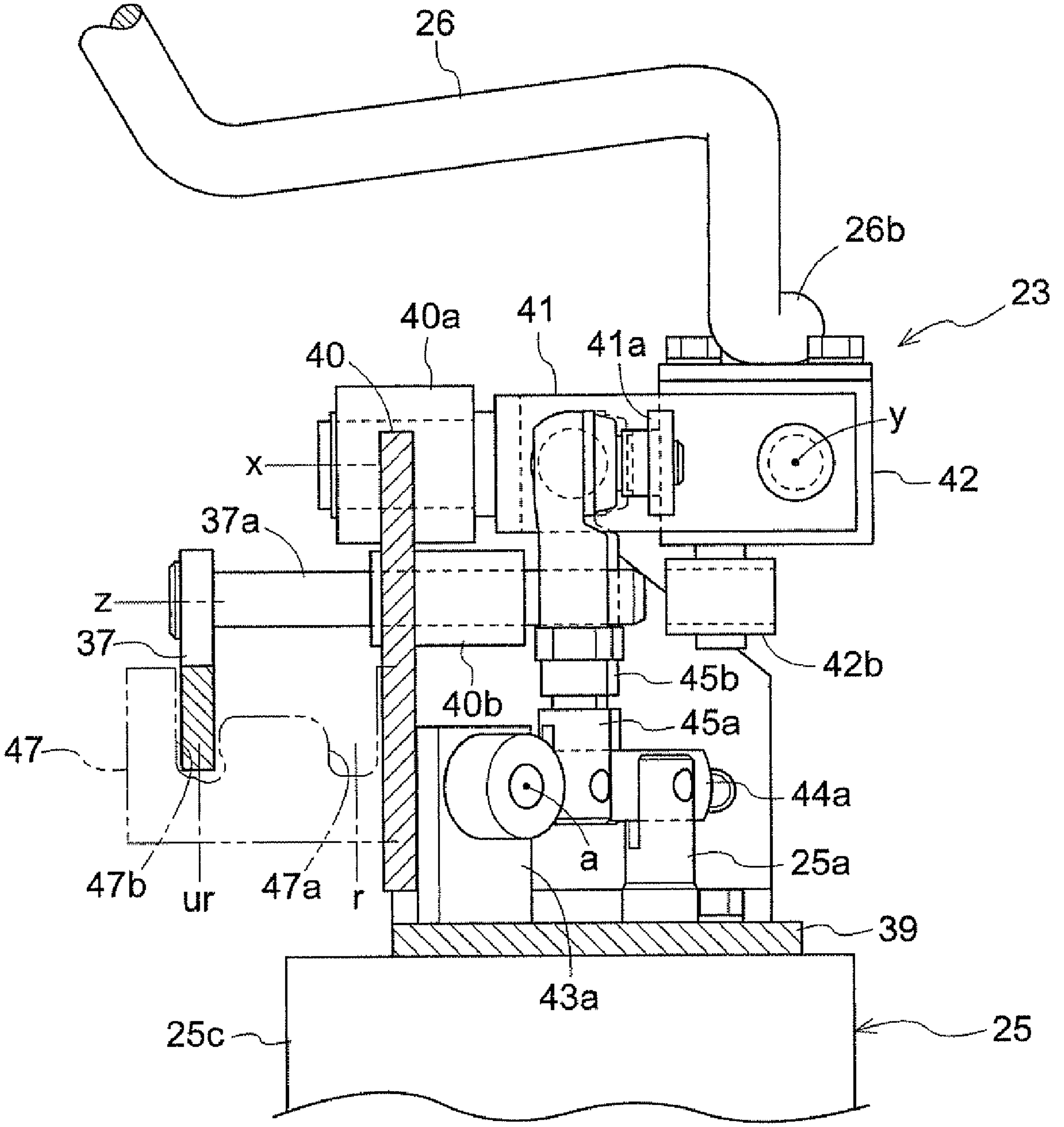
FIG. 11 is a fragmentary longitudinal cross-sectional front view showing the state in which the locking lever is operated to the lock-releasing position.

In the configuration described above, when the vehicle is not being operated, the locking lever 37 slides from the space S to the locked position r on the inward side of the vehicle body, the locking pin 37*a* is inserted through the boss 42*b* of the second pivot member 42, and the locking lever 37 is then urged by the extension spring 46 to engage with the first concavity 47*a*, whereby the operating lever 26 can be restrained from swinging in the cross formation (see FIGS. 9 and 10). Additionally, when the vehicle is not being operated, the locking lever 37 slides from the space S to the lock-releasing position ur on the outward side of the vehicle body, the locking pin 37*a* is removed from the boss 42*b* of the second pivot member 42, and the locking lever 37 is then urged by the extension spring 46 to engage with the second concavity 47*b*, whereby the operating lever 26 can be allowed to swing in the cross formation (see FIG. 11).

In other words, the operating lever 26 is arranged so that the handle 26*a* is positioned above the front part of the right-side rear fender 24, which is in proximity to the driver seat 4, thus improving the operability of the operating lever 26. Additionally, while the vehicle is not being operated, the locking lever 37 is in the locked position r; thereby preventing the front loader R from being operated by unexpected contact with the operating lever 26.

Placing the locking lever 37 in the space between the right-side rear fender 24 and the driver seat 4 in proximity to the driver seat 4 makes it possible to prevent the locking lever 37 from being a hindrance to occupants boarding the tractor, while improving the operability of the locking lever 37.

Figure 3:
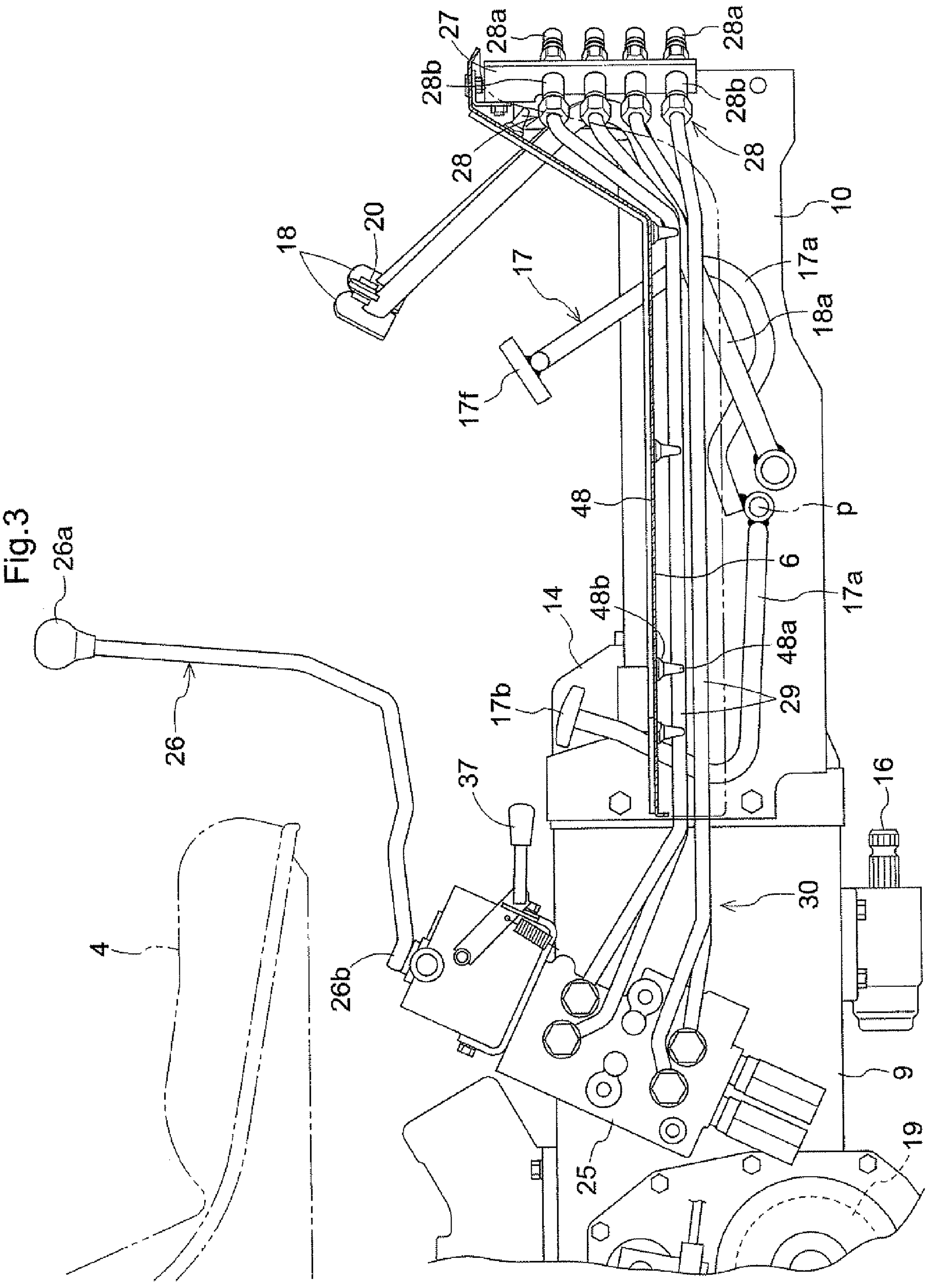
FIG. 3 is a fragmentary longitudinal cross-sectional side view showing the arrangement of the operating system in an implement.
Figure 12:
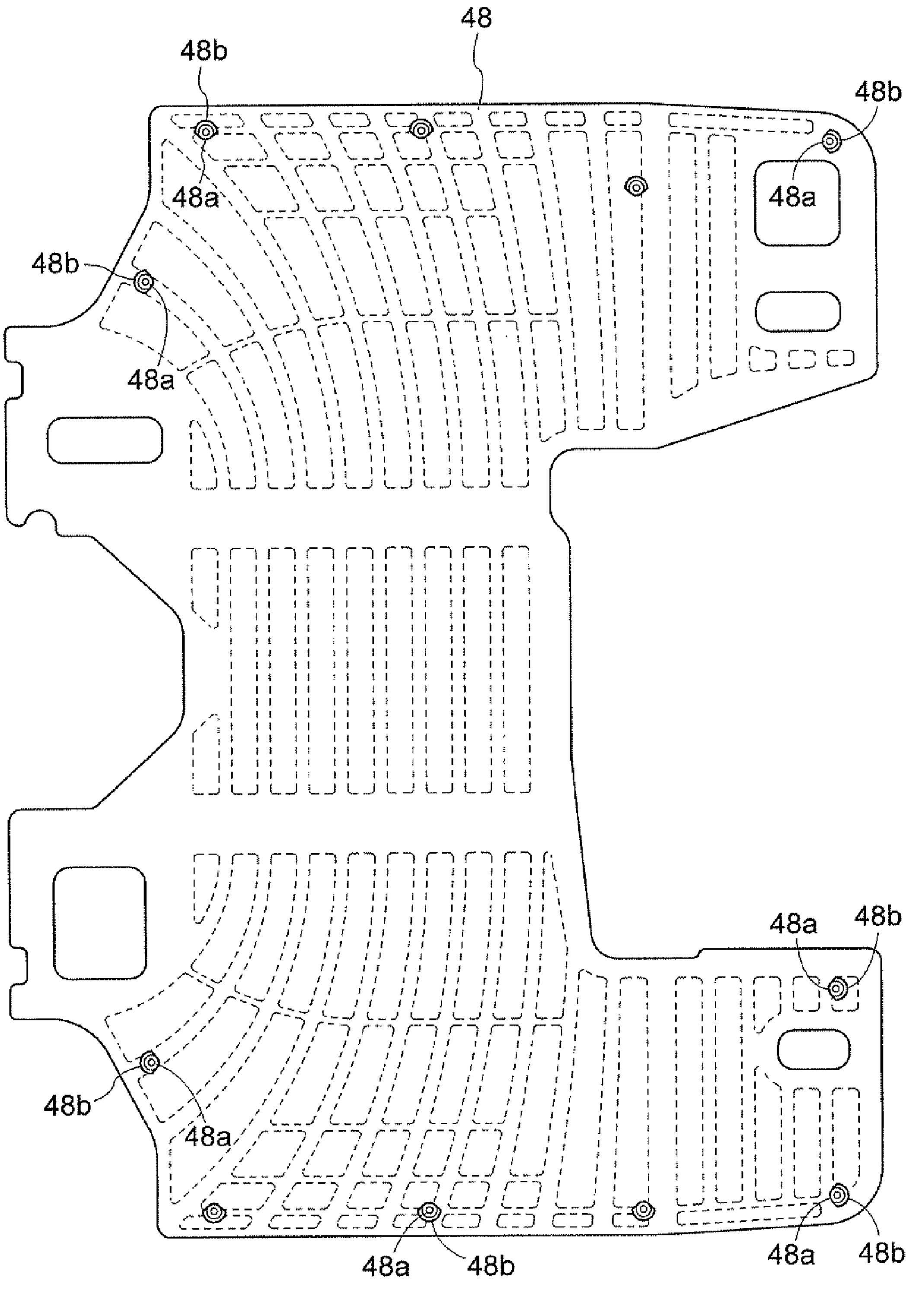
FIG. 12 is a bottom view of a mat showing the arrangement of protuberances and the shapes and orientations of flanges.
Figure 13:
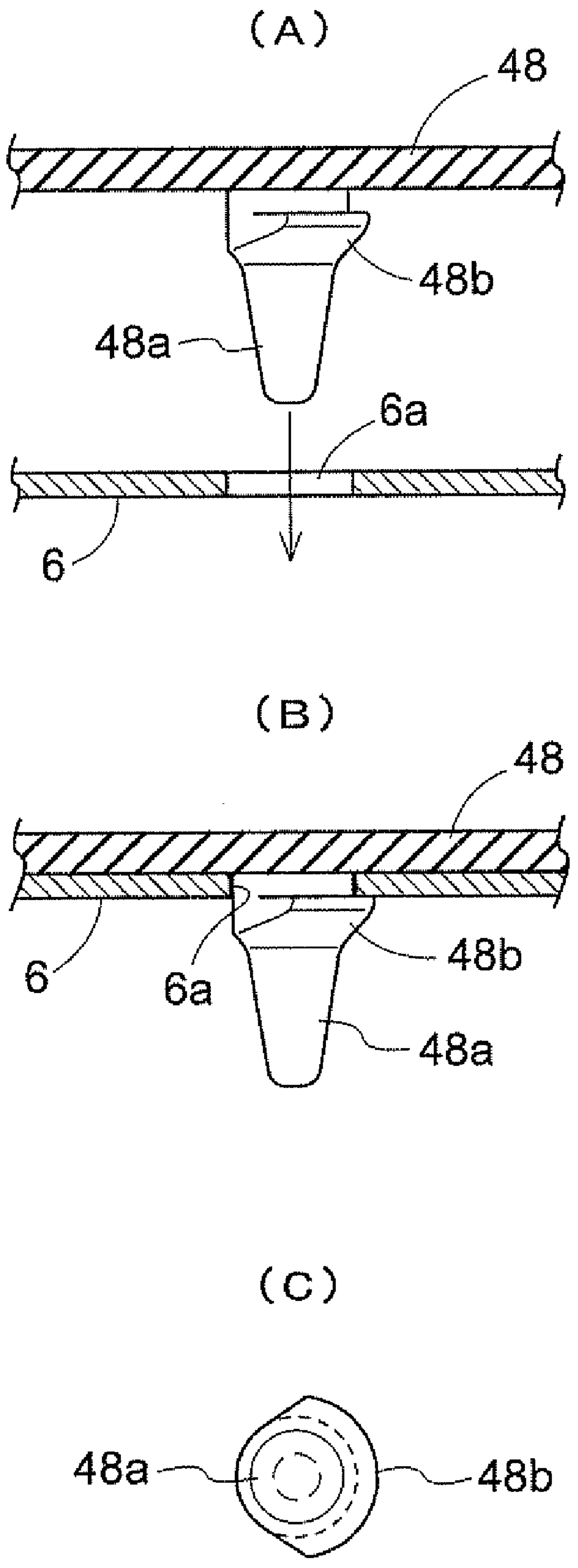
FIG. 13 is a fragmentary longitudinal cross-sectional side view showing the structure for attaching the mat to a boarding step.

A rubber mat 48 is laid on the boarding step 6, as shown in FIGS. 3, 12, and 13. A plurality of circular attachment holes 6*a* for attaching the mat is formed in the external periphery of the boarding step 6. A plurality of protuberances 48*a* that are removably inserted through the corresponding attachment holes 6*a* and a plurality of flanges 48*b* that retain the protuberances 48*a* in the attachment holes 6*a* are integrally formed in the reverse surface of the mat 48.

The mat 48 can thereby be attached to the boarding step 6 without providing rivets or other such fasteners for attaching the mat. It is also possible to avoid compromising aesthetic value as a result of rivet heads or the like being exposed in the front surface of the mat 48.

Considering the possibility that the mat 48 could be overturned by external forces acting on the external periphery of the mat 48, the flanges 48*b* are formed into fan shapes in the proximal end sides of the corresponding protuberances 48*a*, as shown in FIGS. 12 and 13. These fan shapes extend from the external peripheries of the protuberances 48*a* towards the external periphery of the mat 48, and there are no portions that extend from the external peripheries of the protuberances 48*a* towards the center of the mat 48.

It is thereby easy to insert and remove the protuberances 48_a_ into and out of the attachment holes 6_a_, in comparison with a case in which the flanges 48_b_ are formed into circles. Additionally, it is possible to prevent the protuberances 48_a_ from being drawn out of the attachment holes 6_a_ by external forces acting on the external periphery of the mat 48, similar to a case in which the flanges 48_b_ are formed into circles.

Other Embodiments

[1] Instead of a tractor, the work vehicle may be a riding-type rice planter or the like.

[2] Instead of a front loader, the implement R may be a snow removal apparatus, a mower, or any other apparatus that has hydraulic actuators 34, 35.

[3] Instead of hydraulic cylinders, the hydraulic actuators 34, 35 may be hydraulic motors or the like.

[4] The configuration and number of mountings of the control valve 25 allow for various modifications. For example, the control valve 25 may be configured with one or three or more spools provided to a single valve body 25_c_. Another possibility is to provide two or more control valves 25 beneath the driver seat 4.

[5] The shape and number of mountings on the operating lever 26 allow for various modifications in accordance with the configuration and number of mountings on the control valve 25, and other factors.

[6] The configuration of the link mechanism 23 allows for various modifications in accordance with the configuration and number of mountings on the control valve 25, the configuration and number of mountings on the operating lever 26, and other factors.

[7] The arrangement of the control valve 25 and link mechanism 23 allows for various modifications, as long as they are positioned beneath the driver seat 4 so as not to interfere with passengers boarding the work vehicle or with the operation of the work vehicle.

[8] The locking lever 37 may also be positioned between the driver seat 4 and a left-side rear fender 24.

What is claimed is:

1. An operating apparatus for a work vehicle with a detachable implement provided with a hydraulic actuator comprising:

a control valve that is disposed beneath a driver seat of the work vehicle and that controls flow of hydraulic fluid to the hydraulic actuator;

an operating lever that operates the control valve, the operating lever having a handle thereof protruding, in a lateral side view of the work vehicle, from a rear fender that is located at a lateral side of the driver seat;

a link mechanism that is disposed beneath the driver seat of the work vehicle and that operatively connects the control valve to the operating lever; and a locking lever configured to be switched between a locked position for holding the operating lever in a neutral position, and a lock-releasing position for releasing the hold on the operating lever, wherein the locking lever is movable in a lateral direction of the work vehicle so as to be switched between the locked position and the lock-releasing position;

a holding clasp that holds the locking lever at the locked position and the lock-releasing position, wherein the holding clasp is mounted on the control valve and extends to a position adjacent the rear fender below the locking lever; and a spring that urges the locking lever downward.

2. The operating apparatus of claim 1, wherein the link mechanism has a first pivot member that rotates around a first axis extending left and right, and a second pivot member that rotates around a second axis extending front to back.

3. The operating apparatus of claim 2, wherein an engaged member is fixed to either one of the first pivot member and the second pivot member;

a locking pin is operatively connected to the locking lever; and wherein a lateral movement of the locking lever causes the locking pin to engage the engaged member, thereby holding the operating lever in the neutral position.

4. The operating apparatus of claim 1, wherein the operating lever has a first portion extending generally in the front-to-back direction in a region in proximity to the link mechanism, a second portion extending generally in the lateral direction from the front end of the first portion, and a third portion extending generally upwardly from the distal end of the second portion.

5. The operating apparatus of claim 1, wherein the holding clasp has a first concavity formed at a position adjacent the control valve and a second concavity formed at a position remote from the control valve, the locking lever being held at the locked position by engaging the first concavity and held at the lock-releasing position by engaging the second concavity.

* * * * *